United States Patent
Jadhav et al.

(10) Patent No.: US 12,310,289 B2
(45) Date of Patent: May 27, 2025

(54) PICKUP BELT HEADER FINGER GUIDE RAMP

(71) Applicant: DEERE & COMPANY, Moline, IL (US)

(72) Inventors: Snehalrao Jadhav, Satara (IN); Glenn E. Pope, Viola, IL (US); Aniruddha Patankar, Pune (IN); Duane M. Bomleny, Geneseo, IL (US); Aaron S. Ritter, Milan, IL (US); Bradley K. Yanke, Eldridge, IA (US)

(73) Assignee: Deere & Company, Moline, IL (US)

( * ) Notice: Subject to any disclaimer, the term of this patent is extended or adjusted under 35 U.S.C. 154(b) by 751 days.

(21) Appl. No.: 17/557,199

(22) Filed: Dec. 21, 2021

(65) Prior Publication Data
US 2023/0189714 A1 Jun. 22, 2023

(51) Int. Cl.
*A01D 57/20* (2006.01)
*A01D 61/00* (2006.01)
*A01D 89/00* (2006.01)

(52) U.S. Cl.
CPC .......... *A01D 57/20* (2013.01); *A01D 61/008* (2013.01); *A01D 89/003* (2013.01)

(58) Field of Classification Search
CPC .... A01D 57/20; A01D 61/008; A01D 89/003; A01D 61/02
See application file for complete search history.

(56) References Cited

U.S. PATENT DOCUMENTS

| | | | | |
|---|---|---|---|---|
| 2,729,049 A * | 1/1956 | Porter | ................ | A01D 89/003 56/177 |
| 2,835,098 A * | 5/1958 | Scheidenhelm | ....... | A01D 45/00 56/327.1 |
| 3,347,031 A * | 10/1967 | De Long | ............. | A01D 45/008 171/27 |
| 3,472,009 A * | 10/1969 | Porter | ................ | A01D 45/007 56/327.1 |
| 3,474,605 A * | 10/1969 | Resetich | ............... | A01D 41/10 56/364 |
| 3,921,375 A * | 11/1975 | Cetrulo, Jr. | .......... | A01D 45/006 171/31 |
| 3,986,561 A * | 10/1976 | Bettencourt | ......... | A01D 45/006 460/145 |
| 3,990,217 A * | 11/1976 | Aoyama | ............. | A01D 45/006 171/14 |
| 4,171,606 A * | 10/1979 | Ziegler | ................ | A01D 41/10 56/364 |
| 4,365,463 A * | 12/1982 | Bettencourt | ......... | A01D 45/006 56/364 |
| 4,430,847 A * | 2/1984 | Tourdot | ............ | A01D 41/1274 474/4 |

(Continued)

FOREIGN PATENT DOCUMENTS

DE 102005020463 A1 11/2006
KR 100547274 B1 * 1/2006 ............. A01D 57/20

*Primary Examiner* — Arpad Fabian-Kovacs (57) ABSTRACT

Pickup belt headers may include a ramp disposed in a gap formed between a first endless belt of a pickup belt assembly and a second endless belt of a transfer belt assembly. Fingers may be provided on the first endless belt, and the fingers may be deflected, such as by pivoting or bending, in response to engagement between the fingers and the ramp to avoid contact between the fingers and the second endless belt.

19 Claims, 7 Drawing Sheets

(56) References Cited

U.S. PATENT DOCUMENTS

| | | | | |
|---|---|---|---|---|
| 5,090,187 | A * | 2/1992 | Mews | A01D 41/10 56/364 |
| 5,822,959 | A * | 10/1998 | Norton | A01D 41/10 56/364 |
| 5,848,523 | A * | 12/1998 | Engel | A01F 15/106 100/88 |
| 7,726,111 | B2 * | 6/2010 | Grywacheski | A01D 89/004 56/364 |
| 7,827,774 | B2 * | 11/2010 | Dow | A01B 73/02 56/192 |
| 8,266,881 | B2 * | 9/2012 | McIlwain | A01D 89/005 56/208 |
| 8,511,052 | B2 * | 8/2013 | Dow | A01D 84/00 56/192 |
| 9,320,198 | B2 * | 4/2016 | Trowbridge | A01D 75/182 |
| 10,028,437 | B2 | 7/2018 | Bomleny et al. | |
| 2008/0236128 | A1 | 10/2008 | Josset | |
| 2014/0090348 | A1 * | 4/2014 | Landon | A01B 73/046 29/428 |

* cited by examiner

PICKUP BELT HEADER FINGER GUIDE RAMP

FIELD OF THE DISCLOSURE

The present disclosure relates generally to agricultural pickup belt headers.

BACKGROUND OF THE DISCLOSURE

Pickup belt headers are used to collect severed crop material from a field. Crops severed during an agricultural operation may be left on the ground in order to allow the crop material to dry, for example. Once a moisture content of the severed crop material reaches a desired level, the severed crop material may be collected using a pickup belt header, such as for subsequent processing by a combine harvester or for baling.

SUMMARY OF THE DISCLOSURE

A first aspect of the present disclosure is directed to a pickup belt header. The pickup belt header may include a frame; a pickup belt assembly coupled to the frame; and a transfer belt assembly coupled to the frame. The pickup belt assembly may include a first endless belt that is movable about a first path and a plurality of fingers extending from the first endless belt. The transfer belt assembly may include a second endless belt that is movable about a second path. A gap may be formed between the first endless belt and the second endless belt, and a ramp may be disposed in the gap. The plurality of fingers may be engageable with the ramp as the first endless belt moves along the first path.

A second aspect of the present disclosure is directed to a method of operating a pickup belt header that includes a frame; a pickup belt assembly coupled to the frame and including a first endless belt movable in a first rotational direction to recover crop material from the ground and transport the crop material to a transfer belt assembly and a second rotational direction, opposite the first rotational direction, and a plurality of fingers extending from the first endless belt. The transfer belt assembly may be coupled to the frame and include a second endless belt that is rotatable in the first rotational direction and the second rotational direction. A gap may be formed between the pickup belt assembly and the transfer belt assembly, and a ramp may be disposed in the gap. The method may include operating the first endless belt in the first rotational direction; engaging at least one finger of the plurality of fingers with a trailing portion of the ramp; one of pivoting or bending the at least one finger of the plurality of fingers in response to engagement between the at least one finger of the plurality of fingers and the ramp as the plurality of fingers is moved along the ramp when the first endless belt is rotated in the first rotational direction; operating the first endless belt in the second rotational direction; engaging the at least one finger of the plurality of fingers with a leading portion of the ramp; and one of pivoting or bending the at least one finger of the plurality of fingers in response to the engagement between the at least one finger and the ramp as the plurality of fingers is moved along the ramp when the first endless belt is rotated in the second rotational direction.

The various aspects may include one or more of the following features. The frame may include side sheets disposed at lateral ends of the frame, and the ramp may be secured to the side sheets. A first lateral end of the ramp may be secured to one of the sides sheets, and a second lateral end of the ramp may be secured to the other of the side sheets. The ramp may include a leading end portion and a trailing end portion. A mounting bracket may be included, and the leading end portion of the ramp may be attached to a mounting bracket. The ramp may be mounted such that a trailing end of the ramp extends into the gap. The ramp may include a first planar portion and a second planar portion disposed at an angle relative to the first planar portion. The ramp may include a curved portion extending between the first portion and the second portion. The transfer belt assembly may include a first roller and a second roller. The second endless belt may wrap around the first roller and the second roller to define a surface portion of the second endless belt that extends between the first roller and the second roller, and the first planar portion of the ramp may extend parallel with the surface portion of the first endless belt. The first endless belt may be movable along the first path in a first direction of rotation and a second direction of rotation opposite the first direction of rotation. The ramp may be formed of a plurality of sections. The first endless belt and the second endless belt may be moved in a first direction of rotation to move crop material in a rearward direction, and the first endless belt and the second endless belt may be operated in a second direction of rotation, opposite the first direction of rotation, to move crop material in a forward direction. Each of the fingers of the plurality of fingers may include a pivot, and each of the plurality of fingers may pivot or bend when engaging with the ramp. The plurality of fingers may pivot about a pivot location, and the pivot location may be formed at an interface between the finger and the first endless belt. The second endless belt may include an exterior surface and at least one protrusion extending from the exterior surface. A gap formed between the first planar portion of the ramp and the exterior surface of the second endless belt may be sized to permit passage of the at least one protrusion. The at least one protrusion may include a cleat extending along the exterior surface or a fastener that secures opposing ends of the second endless belt together to form a continuous belt. The pickup belt assembly may define a first plane. The transfer belt assembly may define a second plane, and an angle defined between the first plane and the second plane may be within a range of 0° to 45°. In some instances, this angle may be within a range of 5° and 15°.

The various aspects may include one or more of the following features. Crop material from the transfer belt assembly may be transferred to the pickup belt assembly as the first endless belt is rotated in the second rotational direction. The second endless belt of the transfer belt assembly may be rotated in the second rotational direction when the first endless belt of the pickup belt assembly is rotated in the second rotational direction. One of pivoting or bending the at least one finger of the plurality of fingers in response to the engagement between the at least one finger and the ramp as the plurality of fingers is moved along the ramp when the first endless belt is rotated in the second rotational direction may include preventing contact between the at least one finger of the plurality of fingers with the second endless belt.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

Words of orientation, such as "up," "down," "top," "bottom," "above," "below," "leading," "trailing," "front," "back," "forward," and "rearward" are used in the context of the illustrated examples as would be understood by one skilled in the art and are not intended to be limiting to the disclosure. For example, for a particular type of vehicle or implement in a conventional configuration and orientation, one skilled in the art would understand these terms as the terms apply to the particular vehicle or implement.

For example, as used herein, with respect to a work vehicle, unless otherwise defined or limited, the term "forward" (and the like) corresponds to a forward direction of travel of the work vehicle over the ground during normal operation of the work vehicle. Likewise, the term "rearward" (and the like) corresponds to a direction opposite the forward direction of travel of the work vehicle.

Also as used herein, with respect to an implement or components thereof, such as a pickup belt header, unless otherwise defined or limited, the term "leading" (and the like) indicates a direction of travel of the implement during normal operation (e.g., the forward direction of travel of a work vehicle transporting an implement). Similarly, the term "trailing" (and the like) indicates a direction that is opposite the leading direction.

The present disclosure is directed to pickup belt headers having endless belts that are operable in a reverse rotational direction without interference between fingers provided on a first endless belt with a second endless belt. Pickup belt headers generally include a pickup belt assembly that includes an endless belt and a plurality of fingers extending therefrom. The endless belt of the pickup belt assembly is operated in a first rotational direction in which the fingers engage crop material located on the ground and lift the crop material onto the endless belt. As the endless belt of the pickup belt assembly continues to operate in the first rotational direction, the retrieved crop material is transported to a second endless belt of a transfer belt assembly. The crop material is deposited onto the endless belt of the transfer belt assembly. When coupled to a combine harvester, the endless belt of the transfer belt assembly conveys the crop material to a feederhouse of the combine harvester. In some instances, the crop material passes through an auger arrangement prior to entering the feederhouse. The harvester, for example, separates grain contained in the collected crop material from material other than grain (MOG). The grain is collected, such as in a bin of the combine harvester, and the MOG is ejected from the combine harvester.

Problems can arise during recovery of the crop material from the ground. For example, the crop material may form a plug in the auger arrangement or the feederhouse of the combine harvester, preventing the crop material from being moved into the combine harvester for processing. To continue processing of the crop material, the plug is cleared from the feederhouse. Conventionally, removing the plug involves stopping the combine harvester, thereby ceasing recovery of the crop material and halting the harvesting operation. Further, the clog of crop material was removed by hand because the endless belts of the pickup belt assembly and the transfer belt assembly are unable to operate in a reversed direction because the fingers of the endless belt of the pickup belt assembly would interfere with the endless belt of the transfer belt assembly, causing damage to one or both of the endless belts, including the fingers.

The present disclosure provides for pickup belt headers that are capable of being operated in a reverse direction, i.e., a direction in which crop material is moved towards a forward end of the pickup belt header in order, for example, to clear crop material creating a clog or other obstruction on the pickup belt header or in a combine harvester (e.g., the feederhouse of a combine harvester) or other work vehicle carrying the pickup belt header.

Figure 1A:
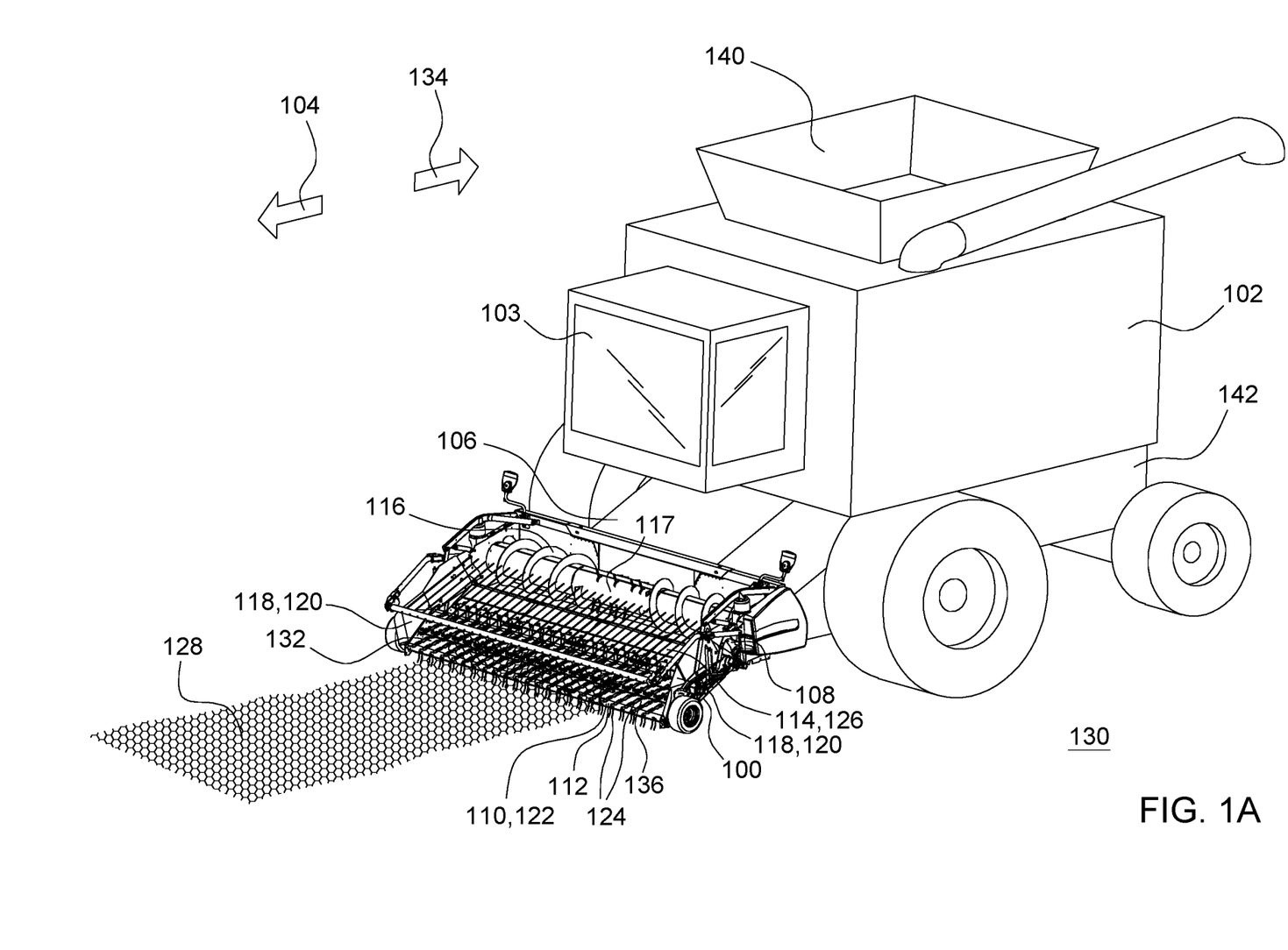
FIG. 1A is perspective view of an example pickup belt header coupled to a combine harvester, according to some implementations of the present disclosure.
Figure 1B:
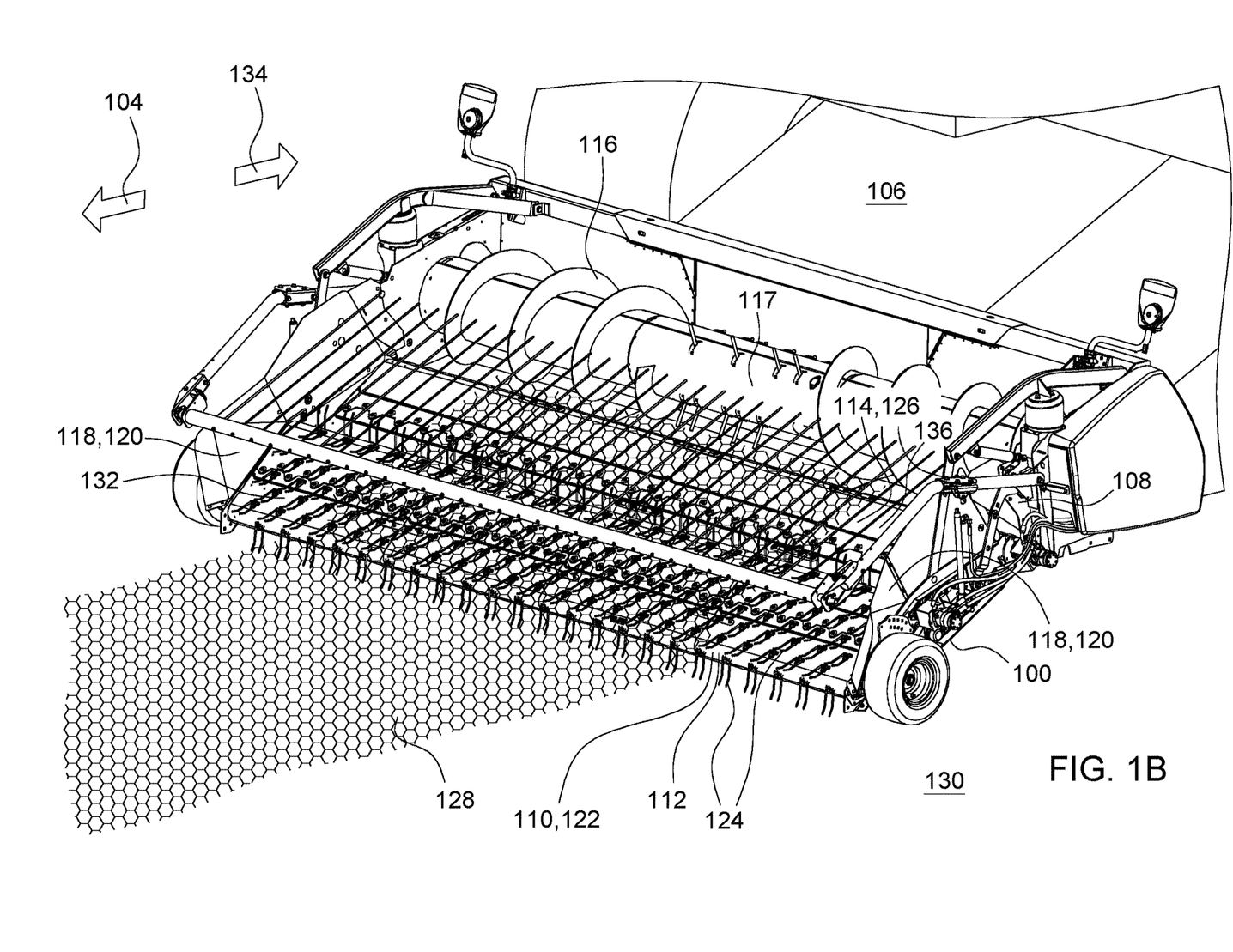
FIG. 1B is a detail view of a portion of the pickup belt header of FIG. 1A.

FIGS. 1A and 1B show an example pickup belt header 100 coupled to a combine harvester 102 within the scope of the present disclosure. The combine harvester 102, along with the pickup belt header 100 coupled thereto, moves forward through a field in the direction of arrow 104 during the course of a harvesting operation in which severed crop material located on the ground is recovered. The combine harvester 102 includes an operator's compartment (referred to hereinafter as "cab 103") and a feederhouse 106. An operator resides within and operates the combine harvester 102 from cab 103. The pickup header 100 is coupled to the feederhouse 106 of the combine harvester 102.

The pickup header 100 includes a frame 108, a pickup belt assembly 110 that extends laterally across a leading end 112 of the pickup belt header 100, a transfer belt assembly 114 disposed adjacent to and rearward of the pickup belt assembly 110, and a screw conveyor 116. The screw conveyor 116 includes bidirectional augers and dual feed augers. In some implementations, the screw conveyor 116 is a single auger that directs crop material towards a central portion 117 of the pickup belt header 100. In some implementations, the screw conveyor 116 includes two augers that direct collected crop material to the central region 117 of the pickup belt header 100. Similar to the pickup belt assembly 110, the transfer belt assembly 114 extends laterally across a width of the pickup belt header 100. The pickup belt assembly 110 and the transfer belt assembly 114 are attached to side sheets 118 of the frame 108. The side sheets 118 are located at lateral ends 120 of the frame 108. The pickup belt assembly 110 includes an endless belt 122 and a plurality of fingers 124 extending from the endless belt 122. The transfer belt assembly 114 also includes an endless belt 126.

During a crop recovery operation as shown in FIG. 1A, the combine harvester 102 moves through a field in the direction of arrow 104, the endless belt 122 of the pickup belt assembly 110 and the endless belt 126 of the transfer belt assembly 114 rotate in a first rotational direction such that the plurality of fingers 124 engage and lift crop material 128 resting on the ground 130 onto an upper surface 132 of the endless belt 122. As the endless belt 122 continues to rotate, the crop material 128 is moved rearwardly in a direction of arrow 134 and deposits the crop material 128 onto the upper surface 136 of the endless belt 126 of the transfer belt assembly 114. The endless belt 126 continues to move the crop material rearward in the direction of arrow 134 where the crop material 128 engages with the screw conveyor 116. The screw conveyor 116 directs the collected crop material towards the central region 117 of the pickup belt header 100 where the crop material is fed into the feederhouse 106 of the combine harvester 102. The crop material 128 is moved through the feederhouse 138 and into the combine harvester 102 where the crop material is processed, such as to separate grain from MOG. The separated grain is collected in a grain bin 140 of the combine harvester 102, and the MOG is ejected from the combine harvester 102, such as at a rear 142 of the combine harvester 102.

Feeding of crop material into a feederhouse of a combine harvester may be reduced or prevented as a result of an obstruction, such as a clog formed of crop material or foreign objects (e.g., rocks, fence posts, tree branches) present within the feederhouse or the auger arrangement. The present disclosure provides systems and methods for removing crop material from a pickup belt header (such as crop material forming an obstruction within a feederhouse) by operating an endless belt of the pickup belt assembly, the transfer belt assembly, or both in a reverse operational direction. As a result, an amount of time and labor associated with clearing the obstruction is reduced, which increases an operational efficiency of the combine harvester. As a result, the crop material recovery operation is able to continue more quickly. Further, an operator is able to remain within the cab of a combine harvester or other work vehicle while removing the obstruction. That is, the operator is able to remain within the cab and clear an obstruction by manipulating a control within the cab of the work vehicle.

Figure 2:
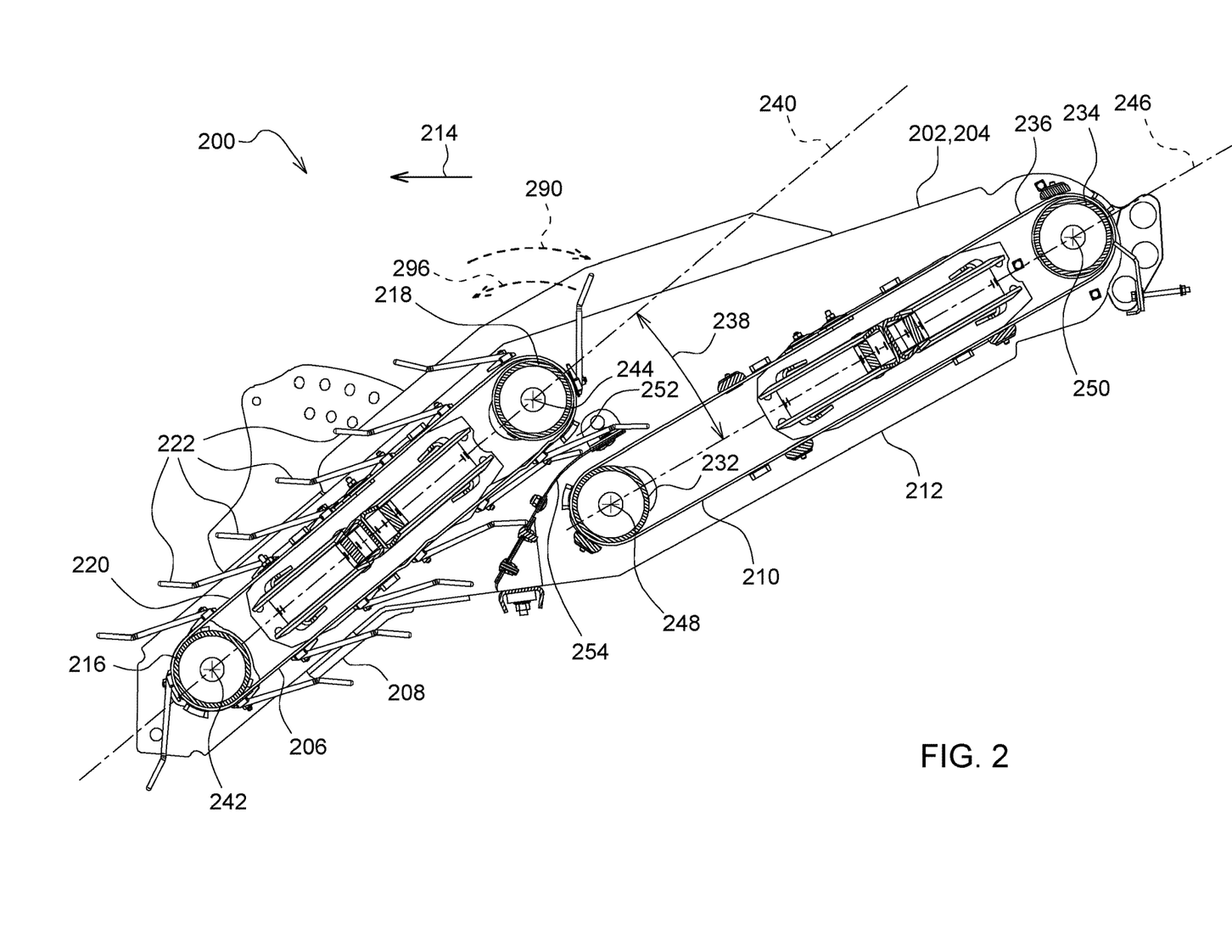
FIG. 2 is a cross-sectional view of an example pickup belt header, according to some implementations of the present disclosure.

FIG. 2 is a cross-sectional view of an example pickup belt header 200. The pickup belt header 200 may be similar to the pickup belt header 100 described earlier. The pickup belt header 200 includes a frame 202. The frame 202 includes side sheets 204 located at laterally opposite ends of the pickup belt header 200. The pickup belt header 200 also includes a pickup belt assembly 206 disposed along a forward portion 208 thereof and a transfer belt assembly 210 disposed along a rearward portion 212 thereof. The pickup belt assembly 206 and the transfer belt assembly 210 are connected to the side sheets 204 at respective opposing ends thereof. Arrow 214 indicates a forward direction in which the pickup belt header 200 is moved when collecting crop material during a harvesting operation.

The pickup belt assembly 206 includes rollers 216 and 218 and an endless belt 220 that wraps around the rollers 216 and 218. The rollers 216 and 218 are cylindrical and extend along a width of endless belt 220, which, in the context of FIG. 2, corresponds to a dimension extending from the surface of FIG. 2. One or both of the rollers 216 and 218 are driven so as to drive the endless belt 220 along a path about the rollers 216 and 218. The pickup belt assembly 206 also includes a plurality of fingers 222 extending at an oblique angle from endless belt 220.

Figure 3:
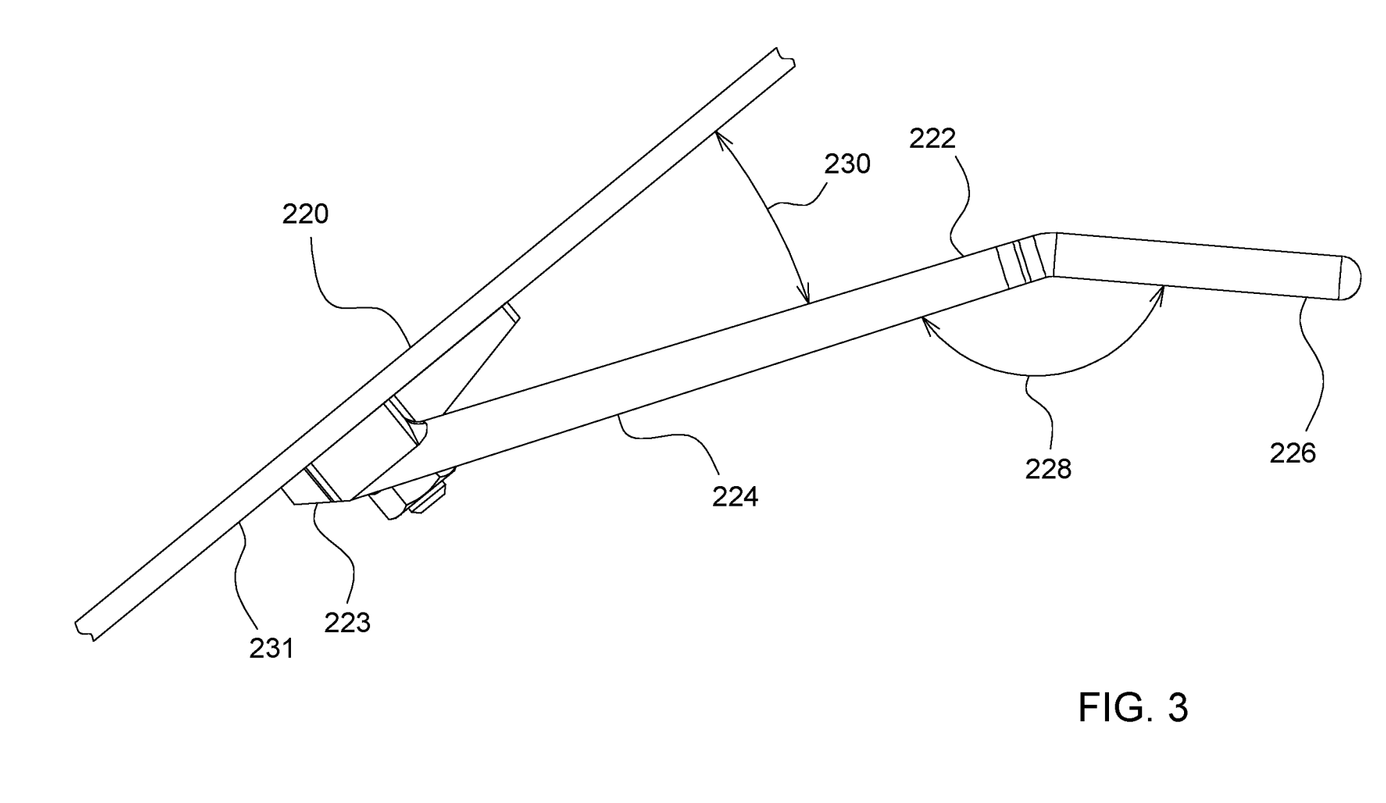
FIG. 3 is a detail view of a portion of an example pickup belt assembly showing an example finger and interface between the finger and endless belt of the example pickup belt assembly, according to some implementations of the present disclosure.

Referring to FIG. 3, in some implementations, the fingers 222 include a first portion 224 and a second portion 226 that is angularly offset from the first portion 224 by an angle 228. In some implementations, the angle 228 is within a range of 135° to 180°. In some implementations, the angle 228 is within a range of 145° to 165°. In some implementations, the angle 228 is approximately 158°. Further, in a normal or undeflected position, the first portion 224 of the fingers 222 forms an angle 230 between an exterior surface 231 of the endless belt 220 and the first portion 224 of the tines within a range of 10° to 60°, in some implementations. In some implementations, the angle 230 is approximately 22°. In some implementations, the angle 230 is approximately 180°. The configuration of the fingers 222 and the configuration of the finger 222 relative to the endless belt 220 are provided merely as examples. Consequently, other configurations for these features are within the scope of the present disclosure.

The fingers 222 are pivotable relative to the endless belt 220 such that the fingers 222 are deflectable in response to an applied force, such as a force applied as the endless belt 220 is circulated about the rollers 216 and 218. Further, in some implementations, the fingers 222 are formed from a flexible material, such as a polymeric material or metal, allowing the fingers 222 to flex or bend elastically in response to an applied force. Thus, in some implementations, as the endless belt 220 is moved over the rollers 216 and 218, the fingers 222 are able to pivot relative to the endless belt 220, flex or bend along the length of the fingers 222, or both.

Referring again to FIG. 2, the transfer belt assembly 210 includes rollers 232 and 234 and an endless belt 236 that wraps around the rollers 232 and 234. The rollers 232 and 234 are cylindrical and extend along a width of endless belt 220. One or both of the rollers 232 and 234 are driven so as to drive the endless belt 236 along a path about the rollers 232 and 234.

The pickup belt assembly 206 is angled relative to the transfer belt assembly 210 as defined by an angle 238 formed between a plane 240 defined by the pickup belt assembly 206 (such as a plane passing through axes of rotation 242, 244 of the rollers 216, 218, respectively, of the pickup belt assembly 206) and a plane 246 defined by the transfer belt assembly 201 (such as a plane passing through axes of rotation 248, 250 of the rollers 232, 234, respectively, of the transfer belt assembly 210). In some implementations, the angle 238 is within a range of 0° to 45°. In some instances, the angel 238 is within a range of 5° to 15°. For example, in some instances, the angle 238 is approximately 10°. However, in other implementations, the angle 238 may have a different value. For example, in some implementations, the angle 238 may be greater than 45°. A gap 252 is formed between the pickup belt assembly 206 and the transfer belt assembly 210. In the illustrated example, the gap 252 is formed at a location where the pickup belt assembly 206 overlaps the transfer belt assembly 210 and, thus, where the endless belt 220 overlaps the endless belt 236. A ramp 254 is disposed in the gap 252 between the pickup belt assembly 206 and the transfer belt assembly 210.

Figure 4:
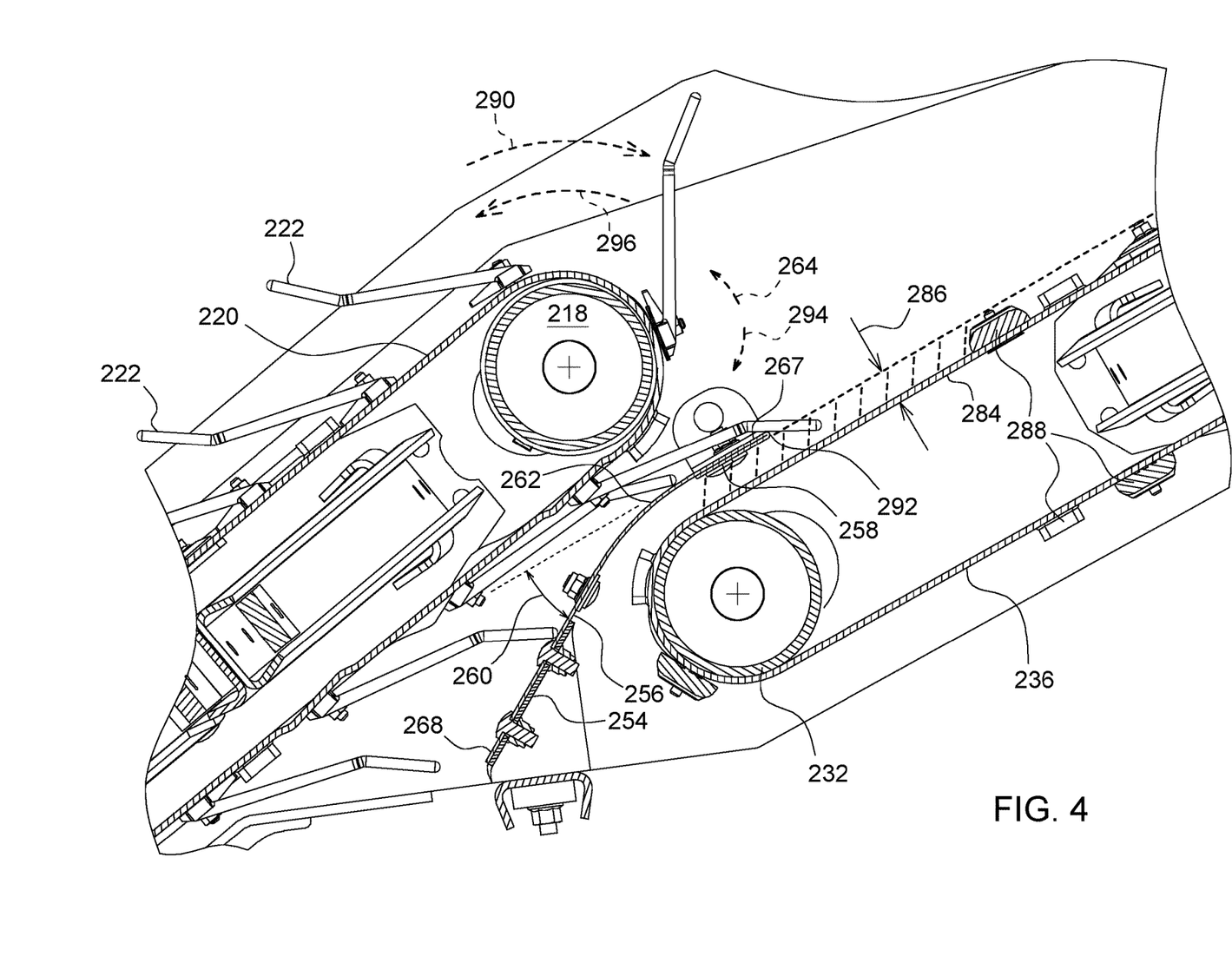
FIG. 4 is a detail view of a portion of the example pickup belt header of FIG. 2.
Figure 5:
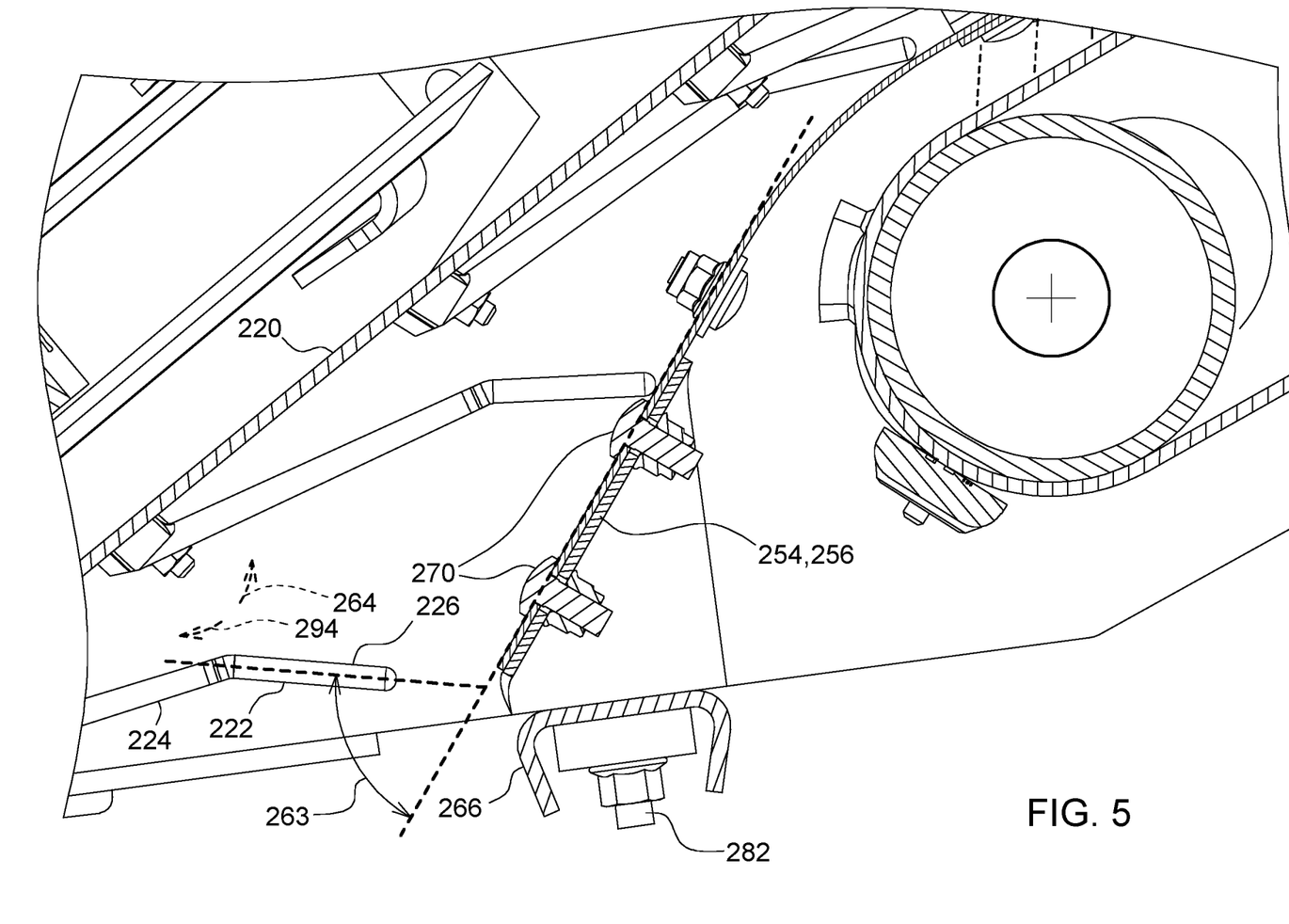
FIG. 5 is another detail view of a portion of the example pickup belt header of FIG. 2.

Referring to FIGS. 4 and 5, the ramp 254 extends laterally between the pickup belt assembly 206 and the transfer belt assembly 210 in the direction of the width of the endless belts 220, 236 and includes a leading end portion 256 that is angularly offset from a trailing end portion 258 by an angle 260. In the illustrated example, the leading end portion 256 and the trailing end portion 258 have a planar shape. In other implementations, one or both of the leading end portion 256 and the trailing end portion 258 is curved or includes a portion that is curved. In some implementations one or both of the leading end portion 256 and the trailing end portion 258 includes a planar portion.

In some implementations, the angle 260 formed between the leading end portion 256 and the trailing end portion 258 is approximately 16.6°. In some implementations, the angle 260 may be within a range of approximately 12° to approximately 21°. The leading end portion 256 and the trailing end portion 258 are connected via a transition portion 262 that extends between the leading end portion 256 and the trailing end portion 258. In the illustrated example, the transition portion 262 forms a curved portion. In some implementations, the transition portion 262 is omitted and the leading end portion 256 and the trailing end portion 258 connect directly.

Although an example range of angles is provided above with respect to angle 260, a more important consideration may be an angle 263 formed between the fingers 222 and the leading end portion 256 of the ramp 254, shown in FIG. 5. This angle 263 can be used to define the angle 260 formed between the leading end portion 256 and the trailing end portion 258 of the ramp 254. For example, referring to FIG. 5, the angle 263 is defined between the second portion 226 of the fingers 222 and the leading end portion 256 of the ramp 254 just prior to engagement therebetween when the pickup belt assembly 206 is operated in a reverse operating condition such that the endless belt 220 is circulated in a counterclockwise direction as understood in the context of FIGS. 2, 4, and 5. The counterclockwise direction associated with the reverse operating condition is illustrated as arrow 296 in FIG. 4. The angle 263 is selected to allow the finger 222 or some part thereof (such as the first portion 224) to pivot in the direction of arrow 264, such as about a pivot location 223 (shown in FIG. 3) formed between the finger 222 and the endless belt 220, bend in the direction of arrow 264, or both upon engagement between the fingers 222 and the ramp 254 when the endless belt 220 of the pickup belt assembly 206 is rotated in the direction of arrow 296. In some implementations, the angle 263 is within a range of approximately 49° to 78°. However, the size of the angle 263 may vary from this range. For example, as a shape of the finger 222 is altered, e.g., the size of the angle 228 (shown in FIG. 3) is varied, as the angle between the leading end portion 256 and the trailing end portion 258 of the ramp 254 is varied, or as the angle 230 is varied, the angle 263 may also vary. However, as explained above, the angle 263 is selected such that, when engagement between the finger 222 and the leading end portion 256 of the ramp 254 begins, the finger 222 is urged to rotate in the direction of arrow 264 towards the endless belt 220.

Figure 6:
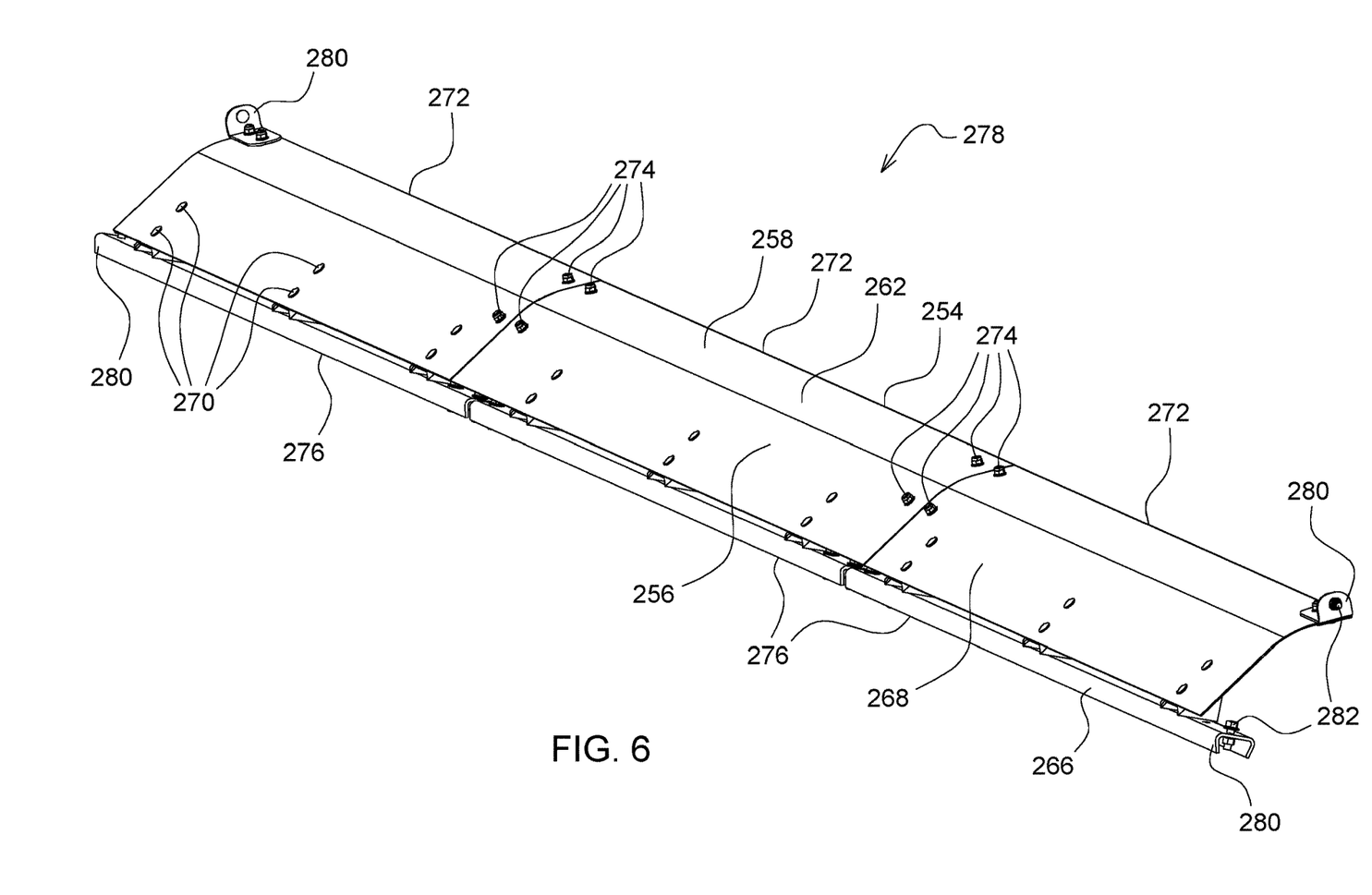
FIG. 6 is an orthogonal view of an example ramp for inclusion on a pickup belt header, according to some implementations of the present disclosure.

Referring to FIGS. 5 and 6, a mounting bracket 266 is coupled to a forward end 268 of the leading end portion 256 of the ramp 254. The mounting bracket 266 extends laterally and is connected to the ramp 254 with fasteners 270. In other instances, the mounting bracket 266 and the ramp 254 are secured in other ways, such as by welding, rivets, or pins. The mounting bracket 266 secures the ramp 254 to the frame 202, such as with fasteners 282. In other implementations, the mounting bracket 266 can be connected to the frame 202 in other ways. As shown in FIG. 6, the ramp 254 is formed of a plurality of ramp portions 272 that are attached to each other. In other implementations, the ramp 254 is a continuous component. As shown in FIG. 6, the ramp 254 includes three ramp portions 272 that are connected, such as with the use of fasteners 274. In the illustrated example, the mounting bracket 266 includes bracket portions 276 that connect to each other and the ramp portions 266. In some implementations, the mounting bracket 266 is a continuous component that attaches to the ramp portions 272 or to the ramp 254 that forms a continuous component.

The mounting bracket 266 and the ramp 254 combine to form an assembly 278 that couples to the frame 202 of the pickup belt header 200. In the illustrated example, the assembly 278 couples to frame 202 at corners 280 of the assembly 278, such as with the fasteners 282. When attached, the trailing end portion 258 of the ramp 254 extends parallel with a portion of an exterior surface 284 of the endless belt 236 (shown in FIG. 4) defined between the rollers 232 and 234. Referring to FIG. 4, the trailing end portion 258 of the ramp 254 is offset from the endless belt 236 by a distance 286 to permit passage of components or portions of the endless belt 236, such as hardware 288, without interfering with the ramp 254. The hardware 288 forms a protrusion extending from the exterior surface 284 of the endless belt 236. In some implementations, the distance 286 is selected so as to provide, for example, clearance between the hardware 288 and the endless belt 236 of approximately two to three millimeters (approximately 0.08 to 0.12 inches). This spacing between the hardware 288 and the trailing end portion 258 of the ramp 254 avoids contact therebetween and damage to either or both.

In some implementations, endless belts, such as endless belts 220 and 236, are formed from a plurality of segments connected together. In some instances, the segments are joined using fasteners, brackets, or other components. Further, cleats may be included on the endless belts 220 and 236. The hardware 288 encompasses these components. A portion of the hardware 288 extends beyond the exterior surface 284 of the endless belt 236, as shown, for example, in FIG. 4. Consequently, the ramp 254 and, particularly, the trailing end portion 258 thereof is offset from the endless belt 236 by an amount sufficient to permit passage of the hardware 288 without contacting the ramp 254. This offset or gap formed between the exterior surface 284 of the endless belt 236 and the ramp 254 may vary depending upon the size of the hardware 288 extending from the exterior surface 284 of the endless belt 236.

In some implementations, vibration or noise dampening material is applied to the ramp 254 or a portion thereof In some implementations, the dampening material is a coating (such as a polymeric coating or foam material) applied to a side of the ramp 254 facing the endless belt 236. The dampening material may reduce vibration of the ramp 254 and, as such, noise associated with the fingers 222 engaging therewith during operation of the pickup belt header 200. As a result, noise associated with operation of the pickup belt header 200 may be reduced.

Reference is now made to FIGS. 2, 4, and 5. During normal operation of the pickup belt header 200, the endless belt 220 of the pickup belt assembly 206 and the endless belt 236 of the transfer belt assembly 210 rotate in a clockwise direction (indicated by arrow 290) as shown in the context of FIGS. 2 and 4. In this operating condition, the fingers 222 engage an edge 292 formed along the trailing end portion 258 of the ramp 254. In response, the fingers 222 pivot or bend in the direction of arrow 264, thereby separating the fingers 222 from the endless belt 236 of the transfer belt assembly 210. As the endless belt 220 continues moving, the fingers 222 continue to contact and follow an exterior surface 267 of the ramp 254 (shown in FIG. 4). As the fingers 222 traverse the exterior surface 267, the fingers 222 begin to pivot or bend in the direction of arrow 294, opposite the direction of arrow 264, as the fingers 222 pass along the transition portion 262 and the leading end portion 256. The fingers 222 return to an initial position or shape thereof by pivoting or bending in the direction of arrow 294 in response to the resiliency of the fingers 222, a connection between the fingers 222 and the endless belt 210, or both. Once the fingers 222 have returned to the initial position or shape thereof, engagement between the ramp 254 and the fingers 222 ceases as the endless belt 220 continues moving. In this way, the fingers 222 are operable to engage and pick up crop material from the ground and transport the crop material to the endless belt 236 of the transfer belt assembly 210 while also being prevented from contacting with the endless belt 236 of the transfer belt assembly 210 due to engagement between the ramp 254 and the fingers 222.

In the reverse operating condition, the endless belt 220 of the pickup belt assembly 206 is circulated about the rollers 216 and 218 in a counterclockwise direction (indicated by arrow 296) as shown in the context of FIGS. 2, 4, and 5. The pickup belt assembly 206 is operated in the reverse operating condition such as to remove a clog or obstruction formed by crop material. In the reverse operating condition, the fingers 222 engage with the leading end portion 256 of the ramp 254 and, in response, pivot or bend in the direction of arrow 264 such that the second portions 226 of the fingers 222 move towards the endless belt 220. In this way, the fingers 222 are prevented from engaging or interfering with the endless belt 236 of the transfer belt assembly 210. As a result, interference between the fingers 222 and the endless belt 236 and damage to the fingers 222, the endless belt 236, or both is avoided.

As the fingers travel along the exterior surface 267 of the ramp 254, pivoting or bending of the fingers 222 in the direction of arrow 264 continues as the fingers 222 move along the leading end portion 256 and the transition portion 262. When the fingers 222 move beyond the edge 292 of the ramp 254, the fingers 222 spring back or otherwise return to the original position and shape thereof. Thus, in this way, the ramp 254 prevents interference between the fingers 222 and the endless belt 236 of the transfer belt assembly 210 when the endless belt 220 is operating in the reverse operating condition.

Without in any way limiting the scope, interpretation, or application of the claims appearing below, a technical effect of one or more of the example implementations disclosed herein is providing a pickup header that allows for reverse operation (for example, to permit removal of crop material from the pickup header) without interference between fingers of a pickup belt assembly and a transfer belt assembly or any associated damage therewith. Another technical effect of one or more of the example implementations disclosed herein is to provide the first technical effect with the use of a component, such as ramp 254, that is fixed relative to the pickup belt assembly and the transfer belt assembly. Another technical effect of the one or more example implementations disclosed herein is to provide a pickup belt header that allows an operator, from a remote location, to clear an obstruction of crop material with reduced effort.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A pickup belt header comprising:
a frame;
a pickup belt assembly coupled to the frame, the pickup belt assembly including:
a first endless belt configured to move about a first path in a first rotational direction and a second rotational direction, opposite the first rotational direction; and
a plurality of fingers extending from the first endless belt, the plurality of fingers pivotable relative to the first endless belt;
a transfer belt assembly coupled to the frame, the transfer belt assembly including
a second endless belt configured to move about a second path;
a gap formed between the first endless belt and the second endless belt;
a ramp disposed in the gap, the plurality of fingers configured to pivot in the second rotational direction in response to engagement with the ramp as the first endless belt moves along the first path in the first rotational direction and the second rotational direction.

2. The pickup belt header of claim 1, wherein the frame further comprises side sheets disposed at lateral ends of the frame and wherein the ramp is secured to the side sheets.

3. The pickup belt header of claim 1, wherein a first lateral end of the ramp is secured to one of the sides sheets and wherein a second lateral end of the ramp is secured to the other of the side sheets.

4. The pickup belt header of claim 1, wherein the ramp comprises a leading end portion and a trailing end portion, further comprising a mounting bracket, and wherein the leading end portion of the ramp is attached to the mounting bracket.

5. The pickup belt header of claim 1, wherein the ramp is mounted such that a trailing end of the ramp extends into the gap.

6. The pickup belt header of claim 1, wherein the ramp comprises a first planar portion and a second planar portion disposed at an angle relative to the first planar portion.

7. The pickup belt header of claim 6, wherein the ramp further comprises a curved portion extending between the first portion and the second portion.

8. The pickup belt header of claim 6, wherein the transfer belt assembly further comprises a first roller and a second roller, wherein the second endless belt wraps around the first roller and the second roller to define a surface portion of the second endless belt that extends between the first roller and the second roller, and wherein the first planar portion of the ramp extends parallel with the surface portion of the first endless belt.

9. The pickup belt header of claim 1, wherein the ramp is formed of a plurality of sections.

10. The pickup belt header of claim 1, wherein the first endless belt and the second endless belt are moved in the first direction of rotation to move crop material in a rearward direction, and wherein the first endless belt and the second endless belt are operated in the second direction of rotation to move crop material in a forward direction.

11. The pickup belt header of claim 1, wherein each of the fingers of the plurality of fingers comprises a pivot, and wherein each of the plurality of fingers pivot about the pivot or bend when engaging with the ramp.

12. The pickup belt header of claim 11, wherein the plurality of fingers pivot about a pivot location and wherein the pivot location is formed at an interface between the finger and the first endless belt.

13. The pickup belt header of claim 1, wherein the second endless belt comprises:
an exterior surface; and
at least one protrusion extending from the exterior surface,
wherein a gap formed between the first planar portion of the ramp and the exterior surface of the second endless belt is sized to permit passage of the at least one protrusion.

14. The pickup belt header of claim 13, wherein the at least one protrusion comprises a cleat extending along the exterior surface or a fastener that secures opposing ends of the second endless belt together to form a continuous belt.

15. The pickup belt header of claim 1, wherein the pickup belt assembly defines a first plane, wherein the transfer belt assembly defines a second plane, and wherein an angle defined between the first plane and the second plane is within a range of 0° and 45°.

16. A method of operating a pickup belt header that includes a frame; a pickup belt assembly coupled to the frame and including a first endless belt movable in a first rotational direction to recover crop material from the ground and transport the crop material to a transfer belt assembly and a second rotational direction, opposite the first rotational direction, and a plurality of fingers extending from the first endless belt; the transfer belt assembly coupled to the frame and including a second endless belt that is rotatable in the first rotational direction and the second rotational direction; a gap formed between the pickup belt assembly and the transfer belt assembly; and a ramp disposed in the gap, the method comprising:
operating the first endless belt in the first rotational direction;
engaging at least one finger of the plurality of fingers with a trailing portion of the ramp;
one of pivoting or bending the at least one finger of the plurality of fingers in the second rotational direction in response to engagement between the at least one finger of the plurality of fingers and the ramp as the plurality of fingers is moved along the ramp when the first endless belt is rotated in the first rotational direction;
operating the first endless belt in the second rotational direction;
engaging the at least one finger of the plurality of fingers with a leading portion of the ramp; and
one of pivoting or bending the at least one finger of the plurality of fingers in the second rotational direction in response to the engagement between the at least one finger and the ramp as the plurality of fingers is moved along the ramp when the first endless belt is rotated in the second rotational direction.

17. The method of claim 16, further comprising transferring crop material from the transfer belt assembly to the pickup belt assembly as the first endless belt is rotated in the second rotational direction.

18. The method of claim 16, further comprising rotating the second endless belt of the transfer belt assembly in the second rotational direction when the first endless belt of the pickup belt assembly is rotated in the second rotational direction.

19. The method of claim 16, wherein one of pivoting or bending the at least one finger of the plurality of fingers in response to the engagement between the at least one finger and the ramp in the second rotational direction as the plurality of fingers is moved along the ramp when the first endless belt is rotated in the second rotational direction comprises preventing contact between the at least one finger of the plurality of fingers with the second endless belt.

\* \* \* \* \*